(12) United States Patent
Karadimitriou et al.

(10) Patent No.: US 7,356,761 B2
(45) Date of Patent: Apr. 8, 2008

(54) COMPUTER METHOD AND APPARATUS FOR DETERMINING CONTENT TYPES OF WEB PAGES

(75) Inventors: Kosmas Karadimitriou, Shrewsbury, MA (US); Jonathan Stern, Newton, MA (US); Michel Decary, Montreal (CA); Jeremy W. Rothman-Shore, Cambridge, MA (US)

(73) Assignee: Zoom Information, Inc., Waltham, MA (US)

( * ) Notice: Subject to any disclaimer, the term of this patent is extended or adjusted under 35 U.S.C. 154(b) by 623 days.

(21) Appl. No.: 09/768,869

(22) Filed: Jan. 24, 2001

(65) Prior Publication Data

US 2002/0138525 A1 Sep. 26, 2002

Related U.S. Application Data

(60) Provisional application No. 60/221,750, filed on Jul. 31, 2000.

(51) Int. Cl.
*G06F 17/00* (2006.01)
*G06F 15/18* (2006.01)
*G06F 17/30* (2006.01)

(52) U.S. Cl. .................... 715/255; 715/234; 706/16; 706/20; 706/45; 707/7; 707/10

(58) Field of Classification Search ................ 715/530, 715/531, 501.1; 707/5, 7, 102, 6, 100, 101; 706/59, 60, 61, 20, 16; 704/9; 382/209, 382/224

See application file for complete search history.

(56) References Cited

U.S. PATENT DOCUMENTS

| 4,270,182 A | 5/1981 | Asija |
| 5,319,777 A | 6/1994 | Perez |

(Continued)

FOREIGN PATENT DOCUMENTS

AU         A-53031/98      8/1998

(Continued)

OTHER PUBLICATIONS

Mitchell, T.M., "Bayesian Learning" in *Machine Learning*, McGraw-Hill (NY) 1997 (p. 154-200).

(Continued)

*Primary Examiner*—Stephen Hong
*Assistant Examiner*—Adam L. Basehoar
(74) *Attorney, Agent, or Firm*—Hamilton, Brook, Smith & Reynolds, P.C.

(57) ABSTRACT

Computer method and apparatus determines content type of contents of a subject Web page. A predefined set of potential content types is first provided. For each potential content type, there are one or more tests having test results that enable quantitative evaluation of the contents of the subject Web page. A respective probability of each potential content type being detected in some contents of the subject Web page is determined. A Bayesian network combines the test results to provide indications of the types of contents detected on the subject Web page. A confidence level per detected content type is also provided. A database stores the determined probabilities and confidence levels, and thus provides a cross reference between Web pages and respective content types of contents found on the Web pages.

20 Claims, 4 Drawing Sheets

U.S. PATENT DOCUMENTS

| | | | |
|---|---|---|---|
| 5,418,951 A * | 5/1995 | Damashek | 707/5 |
| 5,764,906 A | 6/1998 | Edelstein et al. | |
| 5,813,006 A | 9/1998 | Polnerow et al. | |
| 5,835,905 A * | 11/1998 | Pirolli et al. | 707/3 |
| 5,895,470 A | 4/1999 | Pirolli et al. | |
| 5,918,236 A | 6/1999 | Wical | |
| 5,923,850 A | 7/1999 | Barroux | |
| 5,924,090 A | 7/1999 | Krellenstein | |
| 5,943,670 A * | 8/1999 | Prager | 707/5 |
| 6,044,375 A * | 3/2000 | Shmueli et al. | 707/101 |
| 6,052,693 A | 4/2000 | Smith et al. | |
| 6,065,016 A | 5/2000 | Stuntebeck et al. | |
| 6,076,088 A | 6/2000 | Paik et al. | |
| 6,094,653 A | 7/2000 | Li et al. | |
| 6,112,203 A | 8/2000 | Bharat et al. | |
| 6,122,647 A | 9/2000 | Horowitz et al. | |
| 6,128,613 A * | 10/2000 | Wong et al. | 707/7 |
| 6,212,552 B1 | 4/2001 | Biliris et al. | |
| 6,253,198 B1 | 6/2001 | Perkins | |
| 6,260,033 B1 | 7/2001 | Tatsuoka | |
| 6,266,664 B1 * | 7/2001 | Russell-Falla et al. | 707/5 |
| 6,269,369 B1 | 7/2001 | Robertson | |
| 6,301,614 B1 | 10/2001 | Najork et al. | |
| 6,314,409 B2 | 11/2001 | Schneck et al. | |
| 6,336,108 B1 | 1/2002 | Thiesson et al. | |
| 6,336,139 B1 | 1/2002 | Feridun et al. | |
| 6,349,309 B1 | 2/2002 | Aggarwal et al. | |
| 6,377,936 B1 | 4/2002 | Henrick et al. | |
| 6,389,436 B1 * | 5/2002 | Chakrabarti et al. | 715/513 |
| 6,397,205 B1 * | 5/2002 | Juola | 707/2 |
| 6,415,250 B1 * | 7/2002 | van den Akker | 704/9 |
| 6,418,432 B1 | 7/2002 | Cohen et al. | |
| 6,442,555 B1 * | 8/2002 | Shmueli et al. | 707/101 |
| 6,463,430 B1 | 10/2002 | Brady et al. | |
| 6,466,940 B1 | 10/2002 | Mills | |
| 6,493,703 B1 | 12/2002 | Knight et al. | |
| 6,519,580 B1 * | 2/2003 | Johnson et al. | 706/47 |
| 6,529,891 B1 * | 3/2003 | Heckerman | 706/52 |
| 6,553,364 B1 * | 4/2003 | Wu | 707/1 |
| 6,556,964 B2 * | 4/2003 | Haug et al. | 704/9 |
| 6,601,026 B2 | 7/2003 | Appelt et al. | |
| 6,618,717 B1 | 9/2003 | Karadimitriou et al. | |
| 6,621,930 B1 * | 9/2003 | Smadja | 382/224 |
| 6,640,224 B1 | 10/2003 | Chakrabarti | |
| 6,647,396 B2 * | 11/2003 | Parnell et al. | 707/102 |
| 6,654,768 B2 | 11/2003 | Celik | |
| 6,665,841 B1 * | 12/2003 | Mahoney et al. | 715/520 |
| 6,668,256 B1 * | 12/2003 | Lynch | 707/101 |
| 6,675,162 B1 * | 1/2004 | Russell-Falla et al. | 707/5 |
| 6,697,793 B2 | 2/2004 | McGreevy | |
| 6,745,161 B1 | 6/2004 | Arnold et al. | |
| 6,859,797 B1 * | 2/2005 | Skopicki | 706/20 |
| 2001/0009017 A1 | 7/2001 | Biliris et al. | |
| 2003/0221163 A1 * | 11/2003 | Glover et al. | 715/501.1 |
| 2003/0225763 A1 * | 12/2003 | Guilak et al. | 707/7 |
| 2006/0288015 A1 * | 12/2006 | Schirripa et al. | 707/100 |

FOREIGN PATENT DOCUMENTS

| | | |
|---|---|---|
| AU | A-53031-98 | 8/1998 |
| AU | A 53031/98 | 8/1998 |
| JP | 10-320315 | 12/1998 |
| WO | WO 99/67728 | 12/1999 |
| WO | WO 00/33216 | 6/2000 |

OTHER PUBLICATIONS

Domingos, P. and M. Pazzani, "On the Optimality of the Simple Bayesian Classifier under ZeroOne Loss," *Machine Learning*, vol. 29, 1997 (pp. 103-130).

Friedman, N. and M. Goldszmidt, "Building Classifiers Using Bayesian Networks," *Proceedings of the National Conference on Artificial Intelligence (AAAI 96)*, 1996 (pp. 1277-1284).

Lewis, D.D., "Naive (Bayes) at Forty: the Independence Assumption in Information Retrieval," *Proceedings 10th European Conference on Machine Learning (ECML-98)*, 1998 (p. 4-15).

Lam, W. and K. Low, "Automatic Document Classification Based on Probabilistic Reasoning: Model and Performance Analysis," *1996 IEEE Conference on Computational Cybernetics and Simulation*, Orlando, FL 1997, pp. 2719-2723.

PCT International Search Report PCT/US01/22385, Dec. 18, 2002 (4 pp).

ABCNEWS.com, Apr. 28, 1999. http://web.archive.org/web/19990428185649/abcnews.go.com/.

Pazzani, M. et al., "Learning from hotlists and coldlists: Towards a WWW information filtering and seeking agent," *Proc. International Conference on Tools with Artificial Intelligence*, Los Alamitos, CA, 1994, pp. 492-495.

PCT International Search Report PCT/US01/22381, Feb. 12, 2003, 3 pp.

PCT International Search Report PCT/US01/24162, Feb. 13, 2003, 4 pp.

Ball, T. and F. Douglis, "An Internet Difference Engine and its Applications," *Proceedings of COMPCON '96, IEEE Comp. Soc. Press*, Feb. 25, 1996, p. 71-76.

Freitag, D., "Machine Learning for Information Extraction in Informal Domains," *Machine Learning* 39:2/3 (169-202), May/Jun. 2000, p. 169-202.

Kjell, B., "Authorship Attribution of Text Samples Using Neural Networks and Bayesian Classifiers," *IEEE Int. Conf. on Systems, Man, and Cybernetics*, vol. 2, Oct. 5, 1994, pp. 1660-1664.

Singhal, M., "Update Transport: A New Technique for Update Synchronization in Replicated Database Systems," *IEEE Transactions on Software Engineering* 16:12 (1325-1336), Dec. 1, 1990.

PCT International Search Report PCT/US01/41515, Feb. 28, 2003, 4 pp.

Langer, A. and J.S. Rosenschein, "Using Distributed Problem Solving to Search the Web," *Proc. 4th Int. Conf. on Autonomous Agents*, ACM, USA, Jun. 3-7, 2000, pp. 197-198.

International Search Report PCT/US01/22426, Mar. 17, 2003, 4 pp.

International Search Report PCT/US01/23343, Mar. 19, 2003, 4 pp.

Guan, T. and K-F Wong, "KPS: a Web information mining algorithm," *Computer Networks* 31:11-16 (1495-1507) May 17, 1999, Elsevier Science Publishers B.V., Amsterdam.

Miller, R.C. and K. Bharat, "SPHINX: a framework for creating personal, site specific Web crawlers," *Computer Networks and ISDN Systems*, 30:1-7 (119-130) Apr. 1, 1998, North Holland Publishing, Amsterdam.

Powell, T.A. et al., *HTML Programmer's Reference*, (*Appendices A and B*), Osborne/McGraw-Hill, 1998 (pp. 355-377).

PCT International Search Report PCT/US01/22430.

Lorrie Faith Cranor and Brian A. LaMacchia, "Spam!" *Communications of the ACM*, Aug. 1998. vol. 4, No. 8, pp. 74-83.

PCT International Search Report PCT/US01/22425.

A.K. Jain et al. "Data Clustering: A Review." *ACM Computing Surveys*, vol. 31, No. 3, Sep. 1999, pp. 264-323.

Hall, Robert J. "How to Avoid Unwanted Email." *Communications of the ACM*, Mar. 1998. vol. 41, No. 3, pp. 88-95.

Miller, M., "The Complete Idiot's Guide to Online Search Secrets," *Que*, 2000, pp. 172-179.

\* cited by examiner

COMPUTER METHOD AND APPARATUS FOR DETERMINING CONTENT TYPES OF WEB PAGES

RELATED APPLICATION(S)

This application claims the benefit of Provisional Patent Application 60/221,750, filed Jul. 31, 2000, the entire teachings of which are incorporated herein by reference.

BACKGROUND OF THE INVENTION

Generally speaking a global computer network, e.g., the Internet, is formed of a plurality of computers coupled to a communication line for communicating with each other. Each computer is referred to as a network node. Some nodes serve as information bearing sites while other nodes provide connectivity between end users and the information bearing sites.

The explosive growth of the Internet makes it an essential component of every business, organization and institution strategy, and leads to massive amounts of information being placed in the public domain for people to read and explore. The type of information available ranges from information about companies and their products, services, activities, people and partners, to information about conferences, seminars, and exhibitions, to news sites, to information about universities, schools, colleges, museums and hospitals, to information about government organizations, their purpose, activities and people. The Internet became the venue of choice for every organization for providing pertinent, detailed and timely information about themselves, their cause, services and activities.

The Internet essentially is nothing more than the network infrastructure that connects geographically dispersed computer systems. Every such computer system may contain publicly available (shareable) data that are available to users connected to this network. However, until the early 1990's there was no uniform way or standard conventions for accessing this data. The users had to use a variety of techniques to connect to remote computers (e.g. telnet, ftp, etc) using passwords that were usually site-specific, and they had to know the exact directory and file name that contained the information they were looking for.

The World Wide Web (WWW or simply Web) was created in an effort to simplify and facilitate access to publicly available information from computer systems connected to the Internet. A set of conventions and standards were developed that enabled users to access every Web site (computer system connected to the Web) in the same uniform way, without the need to use special passwords or techniques. In addition, Web browsers became available that let users navigate easily through Web sites by simply clicking hyperlinks (words or sentences connected to some Web resource).

Today the Web contains more than one billion pages that are interconnected with each other and reside in computers all over the world (thus the term "World Wide Web"). The sheer size and explosive growth of the Web has created the need for tools and methods that can automatically search, index, access, extract and recombine information and knowledge that is publicly available from Web resources.

The following definitions of commonly used terms are used herein.

Web Domain

Web domain is an Internet address that provides connection to a Web server (a computer system connected to the Internet that allows remote access to some of its contents).

URL

URL stands for Uniform Resource Locator. Generally, URLs have three parts: the first part describes the protocol used to access the content pointed to by the URL, the second contains the directory in which the content is located, and the third contains the file that stores the content:

<protocol>: <domain><directory><file>
For example:
http://www.corex.com/bios.html
http://www.cardscan.com/index.html
http://fn.cnn.com/archives/may99/pr37.html
ftp://shiva.lin.com/soft/words.zip Commonly, the <protocol> part may be missing. In that case, modem Web browsers access the URL as if the http:// prefix was used. In addition, the <file> part may be missing. In that case, the convention calls for the file "index.html" to be fetched.

For example, the following are legal variations of the previous example URLs:
www.corex.com/bios.html
www.cardscan.com
fn.cnn.com/archives/may99/pr37.html
ftp://shiva.lin.com/soft/words.zip Web Page Web page is the content associated with a URL. In its simplest form, this content is static text, which is stored into a text file indicated by the URL. However, very often the content contains multi-media elements (e.g. images, audio, video, etc) as well as non-static text or other elements (e.g. news tickers, frames, scripts, streaming graphics, etc). Very often, more than one files form a Web page, however, there is only one file that is associated with the URL and which initiates or guides the Web page generation.

Web Browser

Web browser is a software program that allows users to access the content stored in Web sites. Modern Web browsers can also create content "on the fly", according to instructions received from a Web site. This concept is commonly referred to as "dynamic page generation". In addition, browsers can commonly send information back to the Web site, thus enabling two-way communication of the user and the Web site.

Every Web site publishes its content packaged in one or more Web pages. Typically, a Web page contains a combination of text and multimedia elements (audio, video, pictures, graphics, etc) and has relatively small and finite size. There are of course exceptions, most notably in pages that contain streaming media, which may appear to have "infinite" size, and in cases of dynamic pages that are produced dynamically, "on the fly". However, even in those cases, there is some basic HTML code that forms the infrastructure of the page, and which may dynamically download or produce its contents on the fly.

In general, it is more useful for someone to identify the contents of "static" pages, which are less likely to change over time, and which can be downloaded into local storage for further processing. When the contents of a page are known, then special data extraction tools can be used to detect and extract relevant pieces of information. For example, a page identified as containing contact information may be passed to an address extraction tool; pages that contain press releases may be given to search engines that index news; and so on. Furthermore, identifying automatically the content type may be useful in "filtering" applications, which filter out unwanted pages (e.g. porn filters).

Simple filters used today work mostly on the basis of keyword searches. The current invention, however, uses a much more sophisticated and generic technique, which combines several test outcomes and their statistical probabilities to produce a list of potential content types, each one given with a specific confidence level.

There are several applications that can significantly benefit from automatic Web page content identification; for example, see Inventions 4, 5 and 6 as disclosed in the related Provisional Application No. 60/221,750 filed on Jul. 31, 2000 for a "Computer Database Method and Apparatus".

SUMMARY OF THE INVENTION

The purpose of this invention is to automatically identify and classify the contents of a Web page among some specific types, by assigning a confidence level to each type. For example, given the following list of potential content types:

{Contact Information, Press Release, Company Description, Employee List, Other}

The present invention analyzes the contents of some random Web page and produces a conclusion similar to the following:

Contact Information: 93%
Press Release: 2%
Company Description: 26%
Employee List: 7%
Other: 11%

This conclusion presents the probabilities that the given Web page contains each one of the pre-specified potential content types. In the above example, there is 93% probability that the given Web page contains contact information, 2% probability that it contains a press release, 26% that it contains company description, 7% that it contains an employee list, and 11% that its content actually does not fit in any of the above types.

The present invention method includes the steps of:
providing a predefined set of potential content types;
for each potential content type, running tests having test results which enable quantitative evaluation of at least some contents of the subject Web page being of the potential content type;
mathematically combining the test results; and
based on the combined test results, assigning a respective probability, for each potential content type, that some contents of that type exists on the subject Web page.

Apparatus embodying the present invention thus includes a predefined set of potential content types and a test module utilizing the predefined set. The test module employs a plurality of processor-executed tests having test results which enable, for each potential content type, quantitative evaluation of at least some contents of the subject Web page being of the potential content type. For each potential content type, the test module (i) runs at least a subset of the tests, (ii) combines the test results and (iii) for each potential content type, assigns a respective probability that at least some contents of that type exists on the subject Web page.

The set of potential content types includes one or more of the following:
organization description,
organization history,
organization mission,
organization products/services,
organization members,
organization contact information,
management team information,
job opportunities,
press releases,
calendar of events/activities,
biographical data,
articles/news with information about people,
articles/news with information about organizations, and
employee roster.

In a preferred embodiment of the present invention, the step of combining includes producing a respective confidence level for each potential content type, that at least some content of the subject Web page is of the potential content type. Further, a Bayesian network is used to combine the test results. The Bayesian network is trained using a training set of Web pages with respective known content types such that statistics on the test results are collected on the training set of Web pages.

In accordance with one aspect of the present invention, the tests involve:

(i) determining whether a predefined piece of data or keyword appears in the page (e.g., people names, telephone numbers, etc.), (ii) examining syntax or grammar or text properties (e.g., number of passive sentences, number of sentences without a verb, percentage of verbs in past tense, etc.), (iii) examining the page format and style (e.g., number of fonts used, existence of tables, existence of bullet lists, etc.), (iv) examining the links in the page (e.g., number of internal links, number of external links, number of links to media files, number of links to other pages, etc.), and/or (v) examining the links that refer to this page (e.g., number of referring links, key words in referring links, etc.).

In accordance with another aspect of the present invention, storage means (e.g., a database) receives and stores indications of the assigned probabilities of each content type per Web page as determined by the test module. The storage means thus provides a cross reference between a Web page and respective content types of contents found on that Web page.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
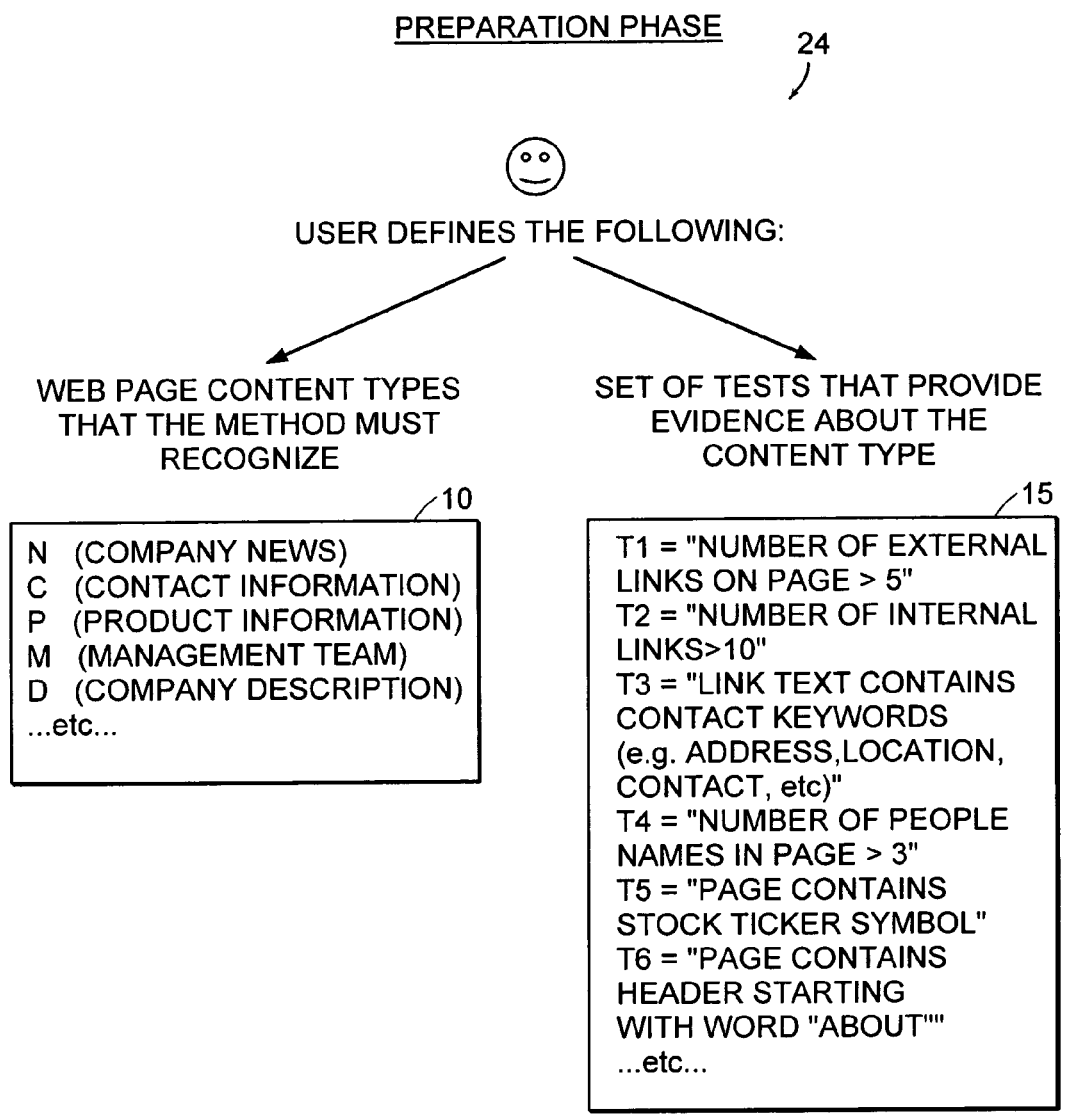
FIG. 1 is an overview of the preparation phase for the present invention.

Every Web page is simply a container of information. There are no restrictions or standard conventions about the type of information it contains, its style, or its format. Therefore it is very difficult for computer programs to automatically extract information from a random Web page, since there are no rules or standards that could help them locate the information, or simply determine if the information exists at all.

The present invention helps solve the second part of this problem, namely to determine what kind of information a given Web page contains. Once the content type of a Web page is known, specialized techniques can be used to locate and extract this content (e.g. see Inventions 5 and 6 as disclosed in the related Provisional Application No. 60/221, 750 filed on Jul. 31, 2000 for a "Computer Database Method and Apparatus").

A simplistic approach in identifying the contents of a Web page is to develop and use a set of rules similar to the following:

If a page contains long paragraphs, and it contains at least one stock ticker symbol, and it contains a section entitled "About . . . ", and it contains at least one phone number or at least one address at the end, then it is a press release.

However, there are several problems associated with developing and using these kinds of rules, for example:

a) these rules may become very complicated, hard to understand, and are error prone,
b) they are very rigid, in the sense that a rule either fires or not. In other words, no "partial credit" is given when a rule is only partially satisfied,
c) the end result of implementing these rules is simply a classification, but without any measure of the confidence level associated with this classification,
d) the rules are developed based mostly on intuition and simple observations, without associating any kind of statistical confidence or measure with each rule.

The present invention circumvents all these problems by replacing the rule-based approach with a series of tests, statistical training, and mathematical combination of the test results to produce a list of the potential content types and an accurate measure of the confidence level associated with each type. In a preparation phase, the user defines the set of content types that the invention must recognize within Web pages, and prepares tests that provide evidence about one or more of these types. Next is a training phase. During this phase, the user runs all the tests on a set of Web pages with known content types. Then, the results of the tests are used to calculate statistical conditional probabilities of the form P(Test result|Hypothesis), i.e. the probability that a particular test result will appear for a particular test, given a particular hypothesis. The resulting table with probabilities can then be used for classification. Finally, in use, the user runs the tests prepared in the preparation phase on a subject Web page with unknown content types and collects the test results. Then, the user combines the test results using the probabilities from the training phase and calculates a confidence level for each of the potential content types, as they have been identified during the preparation phase.

More specifically, the current invention uses the following steps:

A. Preparation
a) Create the list of the content types to identify
b) Create a set of tests that provide evidence (either "positive" or "negative") about these types based on the language content, format, style, or structure of a Web page B. Training
a) Run the tests on a training sample of many Web pages with known content types
b) Collect the test results and calculate conditional probabilities for all combinations of test outcomes and hypothesis values C. Classification
a) Run the tests on a given Web page
b) Combine the conditional probabilities from the test results using a series of Bayesian Networks to produce a confidence level for each type The following provides more details about each step.

With reference to FIG. 1, a preparation phase 24 is illustrated. The first task in identifying the contents of a Web page is, naturally, to decide what kind of content types 10 a user is interested in. For example, one user may need to identify pages that contain company-related information. In that case, the set 10 of potential content types may be the following:

{Company Description, Company Locations, Company Contact Information, Company Products, Other}

Yet another user may need to identify pages that contain conference-related information. In that case, the potential content types 10 may be the following:

{Conference Title, Conf. Description, Conf. Keywords, Conf. Dates, Conf. Location, Conf. Call for Papers, Conf. Organizing Committee, Other}

The next step in preparation phase 24 is to prepare tests 15 that provide some evidence whether a page contains some of these content types 10 or not. For example, the following tests may be used to provide evidence about whether a page contains a press release or not:

Test 1: Page contains company keywords, for example: Inc., Corp., Ltd., etc.
Outcome: True or False
Test 2: Page contains section entitled "About . . . "
Outcome: True or False
Test 3: Page contains stock ticker symbols
Outcome: True or False
Test 4: Page contains phone numbers or addresses
Outcome: True or False
. . . etc . . .

Note that all these are binary tests, with two possible outcomes, "True" or "False". However, tests with more than two possible outcomes may also be used, as the following:

Test 5: The number of paragraphs in the page is in one of the following ranges:
A=[0-3], B=[4-10], C=[11-30], D=[31-∞].
Outcome: A, B, C, or D (the corresponding range).
Test 6: The number of words in the page is in one of the following ranges:
Small=[0-300], Medium=[301-1000], Large=[1001-∞].
Outcome: Small, Medium, or Large (the corresponding range).
Test 7: The number of external links in the page is: 0, 1, 2, or more (outcome "M")
Outcome: 0, 1, 2, or M (the corresponding outcome).

In general, the tests 15 may be anything that helps differentiate between two or more of the given types 10. For example, some possible types of tests 15 are the following:

check if an easily recognizable piece of data (a predefined term or keyword) appears in the page (e.g. people names, telephone numbers, etc.)
measure syntax or grammar or text properties (e.g. number of passive sentences, number of sentences without a verb, percentage of verbs in past tense, etc)
examine the page format and style (e.g. number of fonts used, existence of tables, existence of bullet lists, etc.)
examine the links in the page (e.g. number of internal links, number of external links, number of links to media files, number of links to other pages, etc.)

examine the links that refer to this page (e.g. number of referring links, keywords in referring links, etc.) and so on.

The particular kind of tests 15 to develop and use depends of course on the task in hand, i.e. the kind of page content that the user is interested in identifying.

Figure 2:
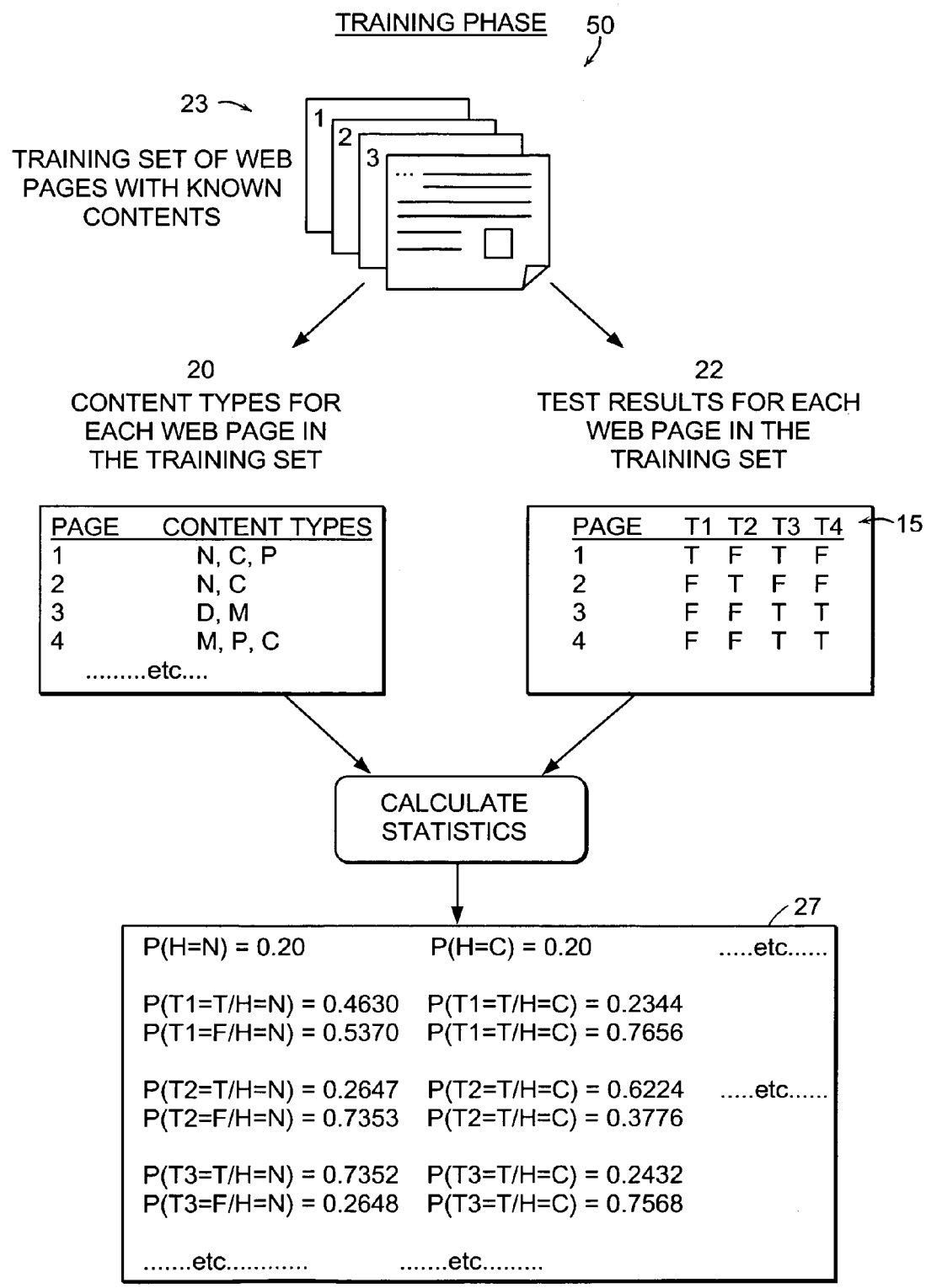
FIG. 2 is a dataflow diagram for the training phase of the present invention.

Now turning to FIG. 2, after a series of suitable tests 15 has been developed, the next step is to measure the statistical connection between every possible test outcome and the target page content types 10. In order to do that, a training set 23 of pages with known content types is collected. For example, if the target content types 10 are the following:

{Company Description, Company Locations, Company Products, Other} then a training set 23 of a few hundred Web pages is collected and the content type of each one is identified (step 20 in FIG. 2) as follows:

URL1, Company Description
URL2, Company Description
URL3, Company Locations+Company Description
URL4, Other
URL5, Company Products
URL6, Other
URL7, Company Description+Company Products
URL8, Company Locations
  . . . etc . . .

In general, the accuracy of the classification that is achieved by this invention increases as the training set 23 becomes larger and more representative of the "real world". The ideal training set 23 is a random sample of a few hundred to a few thousand samples (the actual number depends on the number of target types, and how easily they are distinguishable from each other).

With a training set 23 in hand, the actual training phase/ module 50 consists of the following steps as illustrated in FIG. 2:

a) run all tests 15 on all samples 23
b) collect the test results 22, and calculate the conditional probabilities 23 for each result to appear given each target type 20, i.e. P(test result|content type)

Figure 3:
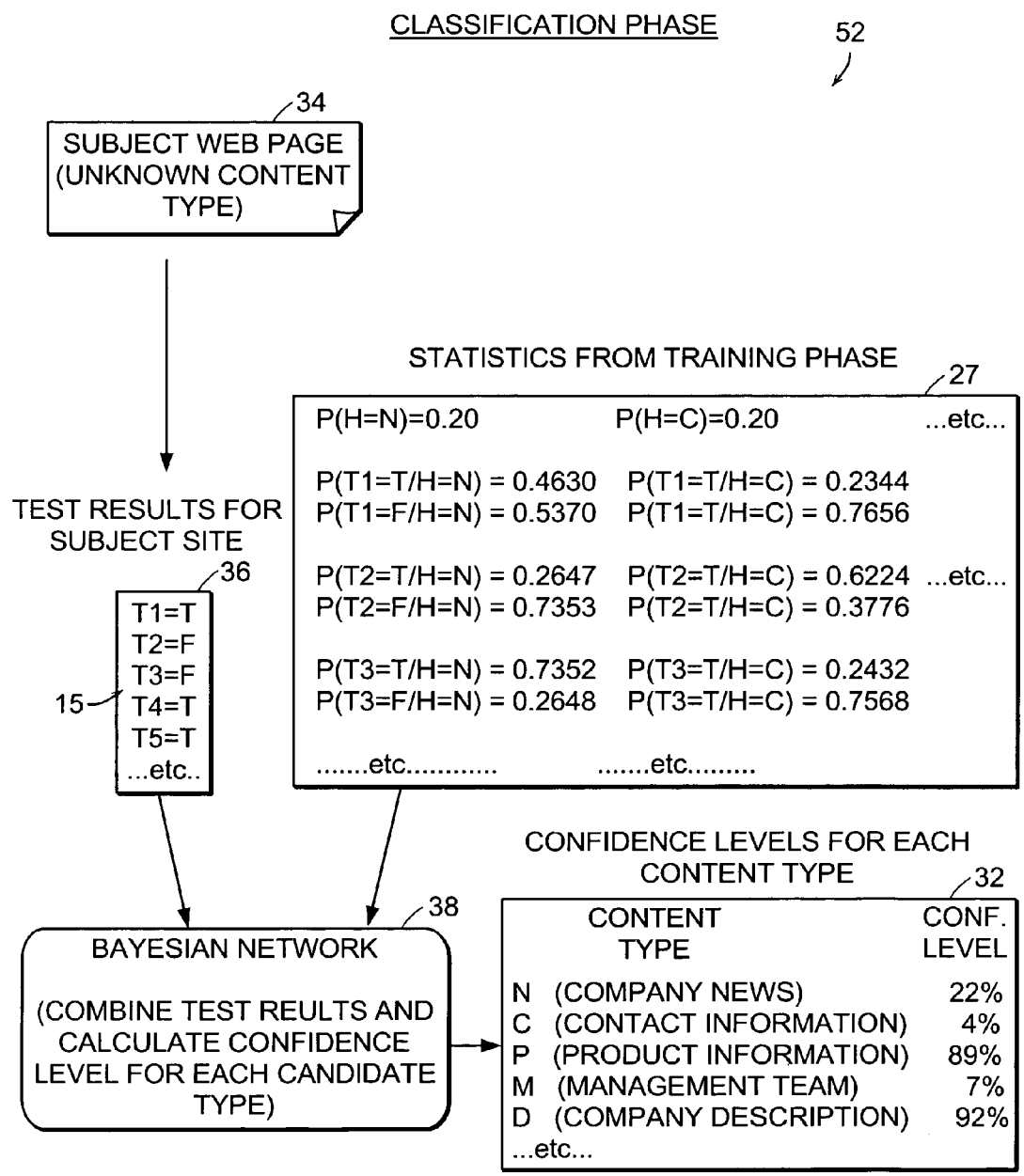
FIG. 3 is an overview of the classification phase.

The test results 22 and the conditional probabilities 27 connected with each result provide evidence about the possibility that the page contains each one of the target content types 20. But a tool is still needed to combine and weight all these pieces of evidence, and produce the final conclusion. The mathematical tool that is used by the present invention is based on the concept of Bayesian Networks and is illustrated in FIG. 3 (discussed later).

Bayesian Networks have emerged during the last decade as a powerful decision-making technique. It is a statistical algorithm that can combine the outcome of several tests in order to chain probabilities and produce an optimal decision based on the given test results.

Bayesian Networks come in many forms, however their basic building block is Bayes' theorem:

$$P(A|B) = P(A) \cdot \frac{P(B|A)}{P(B)}$$

One of the simplest types of Bayesian Networks is the Naïve Bayesian Network. The Naïve Bayesian Network is based on the assumption that the tests are conditionally independent which simplifies considerably the calculations. In Naïve Bayesian Networks, the formula that calculates the probability for some hypothesis given some test results is the following:

$$P(H_i | T_1, T_2, \ldots, T_N) = \frac{F_i}{F_1 + F_2 + \ldots + F_i + \ldots + F_K}$$

where:

$$F = P(H_i) \cdot P(T_1|H_i) \cdot P(T_2|H_i) \cdot \ldots \cdot P(T_N|H_i)$$

$H_1, H_2, \ldots, H_K$ are all the possible values of the hypothesis $T_1, T_2, \ldots, T_N$ are the test results from tests $1, 2, \ldots, N$ respectively.

In order to produce a conclusion and the overall confidence level associated with each content type, several Bayesian Networks are used, one for every content type. Each Bayesian Network is capable to detect the existence of one type of contents, based on the test results. The output of each Bayesian Network is a probability, or confidence level, that the given page contains that type of content.

For example, to distinguish between the following types:
{Company Description, Company Locations, Company Products, Other} the following 3 Bayesian Networks are used:
1. Company Description Bayesian Network
2. Company Locations Bayesian Network
3. Company Products Bayesian Network The Company Description Bayesian Network has the following hypothesis:

Hypothesis: the given Web page contains company description with two possible values, True or False. Passing the test results through this Bayesian Network produces a value between 0 and 1, which corresponds to the probability that the hypothesis is True. For example, if this Bayesian Network outputs 0.83, that means there is 83% confidence level that the given page contains a company description.

The other Bayesian Networks are used in the same way, and the end result is an array of values that correspond to confidence levels about the existence of the target content types.

Referring to FIG. 3, a subject Web page 34 is received as input to Bayesian Network module 52. The Bayesian Network module 52 applies the predefined tests 15 from the preparation phase 24 (FIG. 1). The test results 36 for the subject Web page 34 are combined using a Bayesian Network 38 as described above. The Bayesian Network 38 calculates a confidence level 32 for each candidate content type 10 (FIG. 1). That is, the Bayesian Network 38 outputs an indication (i.e., the probability) of each type 10 of content being detected on the subject Web page 34.

Figure 4:
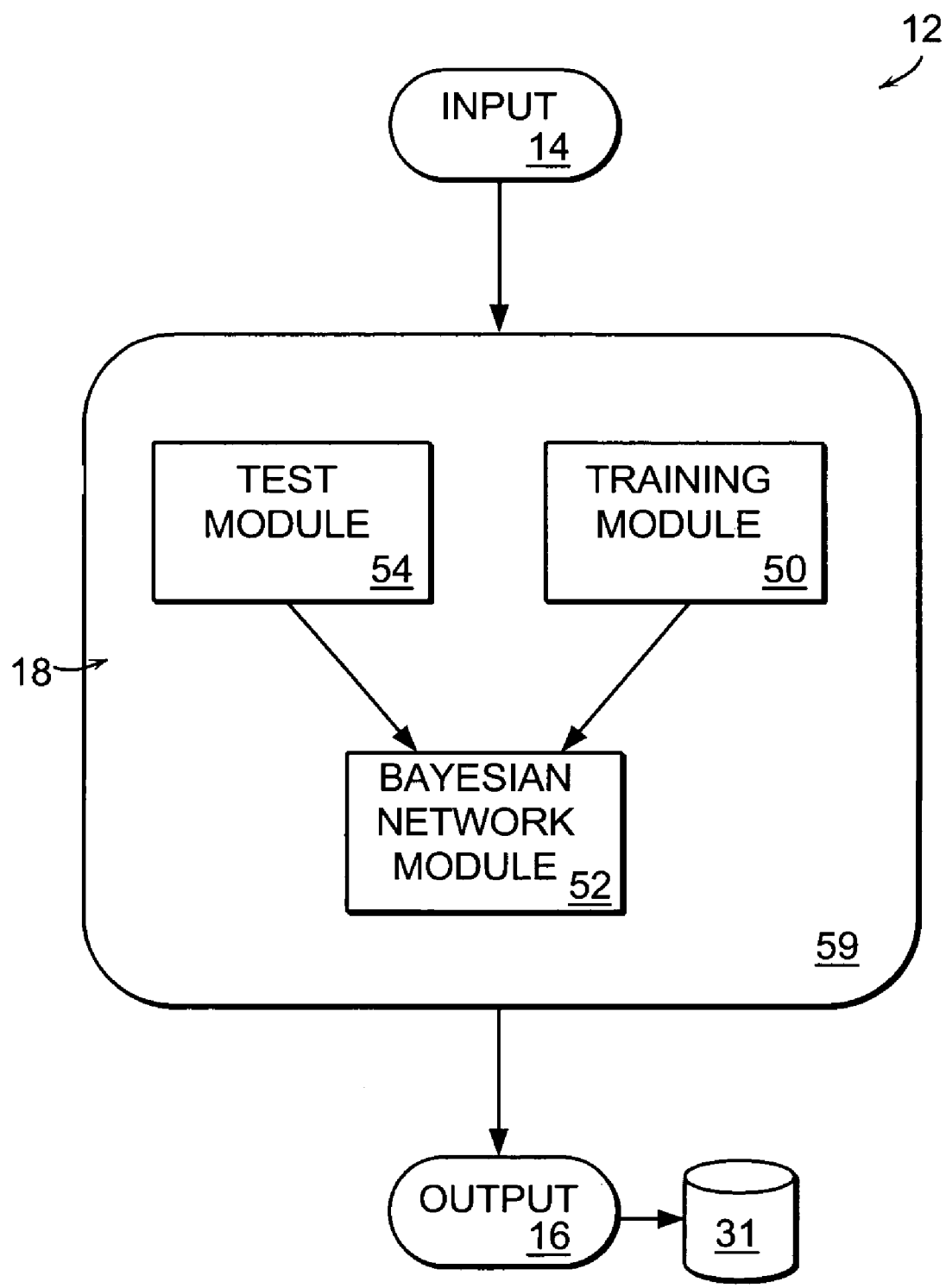
FIG. 4 is a block diagram of a preferred computer embodiment of the present invention.

Illustrated in FIG. 4 is a computer system 12 for implementing the present invention. A digital processor 59 receives input at 14 from input devices (e.g., keyboard, mouse, etc.), a software program, another computer (e.g., over a communications line, the Internet, within an intranet, etc.) and the like. The digital processor 59 provides as output 16, indications of the types of contents detected on given input Web page. Preferably confidence level per detected content type is also output. The output 16 is provided to output devices (e.g., a display monitor, printer, etc.), software programs, another computer (coupled to processor 59 across a communications link) and the like. In the preferred embodiment, the page content types determined by computer system 12 for respective Web pages are output to a database system 31 for storage therein. In particular, the database 31 receives and stores the indications of page content types correlated to (or in a cross-referenced manner with) indications of respective Web pages. As such, a database 31 or index of Web pages and corresponding page content type is formed by the present invention method and apparatus.

In FIG. 4, digital processor 59 stores or has loaded into its memory the invention software 18. As appropriate, processor 59 executes invention software 18 to implement the present invention as discussed above in FIGS. 1-3. In particular, software routine 18 is formed of a training member/module 50, a Bayesian Network module 52 and a test module 54. The test module 54 performs step A (preparation) above, while training module 50 performs step B (training) above with the support of test module 54. Specifically training module 50 applies the tests 15 of step A above to training set 23 of Web pages with known content types. Next training module 50 calculates conditional probabilities 27 for all combinations of test outcomes and hypothesis values.

The Bayesian Network module 52 implements step C (classification) above as previously discussed in conjunction with FIG. 3.

EXAMPLE

As a comprehensive example, a Bayesian Network that recognizes pages that contain press release content is presented next.

The example Bayesian Network identifies if the page contains press release content. Therefore the content types of interest are simply:
{PRESS_RELEASE, OTHER}

In order to identify between these two target types, one Bayesian Network with the following hypothesis is sufficient:

Hypothesis: Page contains press release.
Outcome: True or False.

The following tests are defined to offer evidence regarding this hypothesis:

Test 1: The page has a title.
Outcome: True or False.
Test 2: The page has a copyright statement.
Outcome: True or False.
Test 3: The page has a navigation map.
Outcome: True or False.
Test 4: The page has a line with the word "Contact" followed by at least 1 phone number within the next 10 lines.
Outcome: True or False.
Test 5: The page has a text line that contains the string "Press Release" or "for immediate release".
Outcome: True or False.
Test 6: The first sentence of the first paragraph has a date.
Outcome: True or False.
Test 7: The first sentence of the first paragraph is preceded by a header line. If this header contains a company name, then outcome is "Company".
Outcome: True, False, or Company.
Test 8: First sentence of first paragraph contains a company name.
Outcome: True or False.
Test 9: First sentence of first paragraph contains the word "announce" or a form of it.
Outcome: True or False.
Test 10: First sentence of first paragraph contains "NYSE:" or "NASDAQ:".
Outcome: True or False.
Test 11: There is a line or sentence starting with "For further information" or "For more information" (if this line contains a company name, then outcome is "Company")
Outcome: True, False, or Company.
Test 12: There is a text line starting with "About" (if this line contains a company name, then outcome is "Company").
Outcome: True, False, or Company.
Test 13: The page has a text line containing one of the headers defined in "Stuff Headers" list (see below).
Outcome: True or False.
Test 14: The page has a text line containing one of the headers defined in "Board Headers" list (see below).
Outcome: True or False.
Test 15: The percentage of header lines in the page is in one of the following ranges: 1=[0-13), 2=[13-100].
Outcome: 1 or 2 (the corresponding range).
Test 16: The average sentence length in the page is in one of the following ranges: 1=[0-65), 2=[65-∞].
Outcome: 1 or 2 (the corresponding range).
Test 17: The number of different domains in the page is in one of the following ranges: 1=[0-7), 2=[7-∞].
Outcome: 1 or 2 (the corresponding range).
Test 18: The number of lines that contain a state abbreviation (e.g. MA, LA, FL) is in one of the following ranges: 1=[0-2], 2=[2-∞].
Outcome: 1 or 2 (the corresponding range).
Test 19: The number of noun phrases in the page that appear in sentences and correspond to companies (recognizable by company keywords, e.g. Inc, Corporation, Ltd, etc) is in one of the following ranges: 1=[0-5], 2=[5-∞].
Outcome: 1 or 2 (the corresponding range).
Test 20: The number of noun phrases in the page that appear in sentences and correspond to a city name is in one of the following ranges: 1=[0-2], [2-∞].
Outcome: 1 or 2 (the corresponding range).
Test 21: The URL of the page contains any of the following keywords: 1=press, 2=release, 3=news, 4=pr.
Outcome: 1, 2, 3, 4 (the corresponding keyword) or False (none of these keywords found).

Stuff Headers
appointed officers
board of executive officers
board of management
administrative personnel
company officers
company personnel
corporate executives
corporate officers
corporate officers & management
corporate management
corporation officers
executive biographies
executive bios
executive committee
executive leadership team
executive management
executive management team
executive office
executive officers
executive officers biographies
executive profiles
executive staff
executive team
executives list of officers
management biographies
management profiles
management summary
management team
management
meet our executives
meet the executive team
meet our executive team
meet our team
meet our staff
meet the team
meet the staff
officer biography
officer biographies
officer biography's
officer bios
officer profiles
officers
officers and directors
officers of the corporation
operating officers
operations executives
other executive officers
other officers
other senior management
our executive bios
our management
principal officers
senior executive staff
senior executives
senior leadership
senior management
senior medical staff
senior officers
staff
the officers of the company
the strategic leadership team
about us
about the company
biographies of directors and officers
board of directors and officers
company biographies
company contacts
company leadership
company profile
contacts & team members
corporate directory
corporate governance
corporate management
corporate background
corporate organization
corporate profile
corporate information
e-mail addresses
e-mail directory
directors and executive officers
directors and management
directors and officers
key company personnel
key executives
key personnel
key people
personnel
leadership
leaders
our people
our team
our officers
staff
team
telephone directory
Board Headers
board members
board of directors
company directors
corporate directors
directors
inside directors
outside board members
outside directors
the board of directors
directors emeriti
directors emeritus A training set of 1,688 sample Web pages was used, of which 597 had a press release content, and 1,091 had no press release content. For example, some of the pages used were the following:

| URL | Category |
|---|---|
| //www.valleyforward.org/eeapress.html | PRESS_RELEASE |
| //www.liberalpalette.com/Releases.html | OTHER |
| //www.gettingreal.com/ubb/Forum8/HTML/000096.html | OTHER |
| //www.conagra.com/pressreleases/071299.html | PRESS_RELEASE |
| //www.centennialhc.com/pr20.html | PRESS_RELEASE |
| //www.coveragecorp.com/press_releases/brightlane.html | PRESS_RELEASE |
| //www.nativesearch.com/about.shtml | OTHER |
| //www.homecaremag.com/contact/advertisinginfo.html | OTHER |
| //www.sherrysgreenhouse.com/ScottHgse.html | OTHER |
| //www.abolinc.com/news/laser-pr.htm | PRESS_RELEASE |
| //eonline.com/News/Items/0,1,6434,00.html | OTHER |
| //www.etienneaigner.com/spring2k/catalog/ALLURE.html | OTHER |
| //cgb.panamsat.com/media/pressview.asp?article=1142 | PRESS_RELEASE |
| //www.anaheimoc.org/news_theblock.asp | OTHER |
| //www.custompremis.com/ | OTHER |
| //www.eviciti.com/press_new/press.htm | OTHER |
| //www.summithosting.com/company/news_090499_fpage.asp | PRESS_RELEASE |
| //www.poolehos.org/volunter.htm | PRESS_RELEASE |
| //www.de.stratus.com/news/2000/index.htm | OTHER |
| //www.toolsthatwork.com/ods_to.htm | OTHER |
| //www.hadron.com/swe-bws/newslttr/feb98_pg3.html | OTHER |
| //www.calluna.com/press/00/23may00.html | PRESS_RELEASE |
| //www.1-e-assoc.com/home.html | OTHER |
| //www.alvaka.com/newweb/press/71599.html | PRESS_RELEASE |
| //pour.midcoast.com/manual/sections.html | OTHER |
| //www.metropolitanart.com/masters/caillebo/riverbn.html | OTHER |
| //www.lcef.org/news_menu.asp?menu=4&submenu=4m | OTHER |
| //www.commercebroker.com/corp/news/press027.html | PRESS_RELEASE |
| //www.arizonathunder.com/hirschpartner_press.html | PRESS_RELEASE |
| //www.the-dangerzone.com/press1.htm | PRESS_RELEASE |
| //www.planetweb.net/news/releases/pr030700.html | PRESS_RELEASE |
| //www.mace.com/news/01072000.html | PRESS_RELEASE |
| //www.realworld.com/CUSTOMER.HTM | OTHER |
| //www.oneliberty.com/entrepenueurExactLabs.html | OTHER |
| //www.k9web.com/onelist | OTHER |
| //www.netpulse.comlpress/articles19980630.html | OTHER |
| //www.capecodrec.com/festivals/festivals.html | OTHER |

Running all the defined tests on these sample Web pages and calculating the probabilities of occurrence for each test outcome, the following probabilities table is obtained:

P(H=True)=0.500000
P(H=False)=0.500000
P(T1=True|H=True)=0.986600
P(T1=True|H=False)=0.954170
P(T1=False|H=True)=0.013400
P(T1=False|H=False)=0.045830
P(T1=False|H=False)=0.045830
P(T2=True|H=True)=0.383585
P(T2=True|H=False)=0.342805
P(T2=False|H=True)=0.616415
P(T2=False|H=False)=0.657195
P(T3=True|H=True)=0.276382
P(T3=True|H=False)=0.253896
P(T3=False|H=True)=0.723618
P(T3=False|H=False)=0.746104
P(T4=True|H=True)=0.216080
P(T4=True|H=False)=0.055912
P(T4=False|H=True)=0.783920
P(T4=False|H=False)=0.944088
P(T5=True|H=True)=0.447236
P(T5=True|H=False)=0.017415
P(T5=False|H=True)=0.552764
P(T5=False|H=False)=0.982585
P(T6=True|H=True)=0.557823
P(T6=True|H=False)=0.112455
P(T6=False|H=True)=0.442177
P(T6=False|H=False)=0.887545
P(T7=True|H=True)=0.755102
P(T7=True|H=False)=0.727932
P(T7=False|H=True)=0.119048
P(T7=False|H=False)=0.230955
P(T7=C|H=True)=0.125850
P(T7=C|H=False)=0.041112
P(T8=True|H=True)=0.428571
P(T8=True|H=False)=0.118501
P(T8=False|H=True)=0.571429
P(T8=False|H=False)=0.881499
P(T9=True|H=True)=0.348639
P(T9=True|H=False)=0.013301
P(T9=False|H=True)=0.651361
P(T9=False|H=False)=0.986699
P(T10=True|H=True)=0.132653
P(T10=True|H=False)=0.001209
P(T10=False|H=True)=0.867347
P(T10=False|H=False)=0.998791
P(T11=True|H=True)=0.319933
P(T11=True|H=False)=0.094409
P(T11=False|H=True)=0.661642
P(T11=False|H=False)=0.900092
P(T11=C|H=True)=0.018425
P(T11=C|H=False)=0.005500
P(T12=True|H=True)=0.139028
P(T12=True|H=False)=0.045830
P(T12=False|H=True)=0.772194
P(T12=False|H=False)=0.951421
P(T12=C|H=True)=0.088777
P(T12=C|H=False)=0.002750
P(T13=True|H=True)=0.048576
P(T13=True|H=False)=0.067828
P(T13=False|H=True)=0.951424
P(T13=False|H=False)=0.932172
P(T14=True|H=True)=0.003350
P(T14=True|H=False)=0.007333
P(T14=False|H=True)=0.996650
P(T14=False|H=False)=0.992667
P(T15=1|H=True)=0.979899
P(T15=1|H=False)=0.807516
P(T15=2|H=True)=0.020101
P(T15=2|H=False)=0.192484
P(T16=1|H=True)=0.100503
P(T16=1|H=False)=0.373052
P(T16=2|H=True)=0.899497
P(T16=2|H=False)=0.626948
P(T17=1|H=True)=0.986600
P(T17=1|H=False)=0.918423
P(T17=2|H=True)=0.013400
P(T17=2|H=False)=0.081577
P(T18=1|H=True)=0.979899
P(T18=1|H=False)=0.965170
P(T18=2|H=True)=0.020101
P(T18=2|H=False)=0.034830
P(T19=1|H=True)=0.686767
P(T19=1|H=False)=0.913841
P(T19=2|H=True)=0.313233
P(T19=2|H=False)=0.086159
P(T20=1|H=True)=0.797320
P(T20=1|H=False)=0.925756
P(T20=2|H=True)=0.202680
P(T20=2|H=False)=0.074244
P(T21=1|H=True)=0.537688
P(T21=1|H=False)=0.024748
P(T21=2|H=True)=0.075377
P(T21=2|H=False)=0.004583
P(T21=3|H=True)=0.207705
P(T21=3|H=False)=0.130156
P(T21=4|H=True)=0.112228
P(T21=4|H=False)=0.109074
P(T21=False|H=True)=0.067002
P(T21=False|H=False)=0.731439

The foregoing table of conditional probabilities produced during the Bayesian Network training is used subsequently to combine evidence that a given Web page has some press release content. For example, for the following pages (of unknown content type) the confidence levels obtained are the following:

| Web Page | Confidence Level for Press Release Content |
|---|---|
| //www.picknparlor.com/home.htm | 0.112199 |
| //www.pivotal.com/News_Events/pr_000720.htm | 0.999983 |
| //www.mcdonalds.com/countries/countries.html | 0.117991 |
| //www.cambar.com/company/alliance.asp | 0.338888 |
| //www.mathematica.com/news/jlink.html | 0.981671 |
| //www.faxination.com/about/about_034/press/E_wirelessfax2000.html | 0.999985 |
| //www.dauphintech.com/pressroom/pressrelease6_4_1999.html | 0.316617 |
| //www.domres.com/press/fv.html | 0.680403 |
| //www.kronos.com/uk/news/handpunch.htm | 0.962643 |
| //www.trimble.com/press/presrel/092999a.htm | 0.999999 |
| //www.torian.com/default.htm | 0.113988 |
| //www.mechelonic-engineers.com/feedback.htm | 0.113988 |
| //www.fanhuggers.com/prod12.htm | 0.144708 |
| //www.etienneaigner.com/spring2k/catalog/top_G_G1.html | 0.160069 |
| //www.timetracking.com/events/training.asp | 0.521223 |
| //www.webwatchdog.com/forms/contactform.cfm | 0.111764 |
| //www.laer.com/staff.htm | 0.111519 |
| //www.enessay.com/nsa.disc.html | 0.111251 |
| //www.providencecvb.com/press_releases.cfm?ID=28 | 0.999606 |

By choosing 0.85 as the confidence level threshold for accepting the hypothesis that a page contains press release content, it is straightforward to conclude which of these pages satisfy this hypothesis:

| Web page | Content |
|---|---|
| //www.picknparlor.com/home.htm | other |
| //www.pivotal.com/News_Events/pr_000720.htm | press release |
| //www.mcdonalds.com/countries/countries.html | other |
| //www.cambar.com/company/alliance.asp | other |
| //www.mathematica.com/news/jlink.html | press release |
| //www.faxination.com/about/about_034/press/E_wirelessfax2000.html | press release |
| //www.dauphintech.com/pressroom/pressrelease6_4_1999.html | other |
| //www.domres.com/press/fv.html | other |
| //www.kronos.com/uk/news/handpunch.htm | press release |
| //www.trimble.com/press/presrel/092999a.htm | press release |
| //www.torian.com/default.htm | other |
| //www.mechelonic-engineers.com/feedback.htm | other |
| //www.fanhuggers.com/prod12.htm | other |
| //www.etienneaigner.com/spring2k/catalog/top_G_G1.html | other |
| //www.timetracking.com/events/training.asp | other |
| //www.webwatchdog.com/forms/contactform.cfm | other |
| //www.laer.com/staff.htm | other |
| //www.enessay.com/nsa.disc.html | other |
| //www.providencecvb.com/press_releases.cfm?ID=28 | press release |

While this invention has been particularly shown and described with references to preferred embodiments thereof, it will be understood by those skilled in the art that various changes in form and details may be made therein without departing from the scope of the invention encompassed by the appended claims.

What is claimed is:

1. A computer-implemented method of determining content type of contents of a subject Web page, comprising the steps of:
   providing a predefined set of potential content types, content types being exclusive of indicating formal language of the content;
   for each potential content type, preparing a distinguishing series of tests, the distinguishing series of tests includes:
   i) at least one binary test, and
   ii) at least one non-binary test,
   the at least one binary test and the at least one non-binary test further including at least one test (a) examining syntax or grammar; or (b) examining page format or style other than position of data or a keyword in the subject Web page;
   for each potential content type, running the distinguishing series of tests of tests having test results which enable quantitative evaluation of at least some contents of the subject Web page being of the potential content type,
   mathematically combining the probabilities from all possible combinations of the test results and hypothesis values with respect to content of Web pages of determined content type with the test results of the subject Web page of undetermined content type using at least one Bayesian network; and
   based on the combined test results, assigning a respective probability, for each potential content type, that some contents of that type exists on the subject Web page, and indicating content type, said indicating being exclusive of indicating language in which content is written.

2. A method as claimed in claim 1 wherein the set of potential content types include any combination of organization description, organization history, organization mission, organization products/services, organization members, organization contact information, management team information, job opportunities, press releases, calendar of events/activities, biographical data, articles/news with information about people, articles/news with information about organizations and employee roster.

3. A method as claimed in claim 1 wherein the step of combining includes producing a respective confidence level for each potential content type, that at least some content of the subject Web page is of the potential content type.

4. A method as claimed in claim 1 further comprising the step of training the Bayesian network using a training set of Web pages with respective known content types such that statistics on the test results are collected on the training set of Web pages.

5. A method as claimed in claim 1 wherein the predefined set includes a potential content type of press release and the distinguishing series of tests further includes at least one of:
   (i) determining whether a predefined piece of data or keyword appears in the subject Web page;
   (ii) examining text properties; or
   (iii) determining whether the predefined piece of data or keyword appears in URLs in the subject Web page.

6. The method as claimed in claim 1 wherein the distinguishing series of tests further includes at least one of:
   (i) determining whether a predefined piece of data or keyword appears in the subject Web page;
   (ii) examining text properties; or
   (iii) determining whether the predefined piece of data or keyword appears in URLs in the subject Web page.

7. A method as claimed in claim 1 further comprising the step of storing indications of the assigned probabilities of each potential content type per respective Web page.

8. A database formed by the method of claim 7, said database containing indications of Web pages and corresponding content types determined to be found on respective Web pages.

9. Apparatus for determining content type of contents of a subject Web page, comprising:
   a digital processor coupled to a memory;
   a predefined set of potential content types, each potential content type being exclusive of indicating formal language of the content and associated with a respective distinguishing series of tests, the distinguishing series of tests includes:
   i) at least one binary test, and
   ii) at least one non-binary test,
   the at least one binary test and the at least one non-binary test further including at least one test (a) examining syntax or grammar; or (b) examining page format or style other than position of data or a keyword in the subject Web page;
   a test module utilizing the predefined set, the test module employing the distinguishing series of tests as a plurality of processor-executed tests having test results which enable, for each potential content type, quantitative evaluation of at least some contents of the subject Web page being of the potential content type, for each potential content type, the test module (i) running the respective distinguishing series of tests, (ii) combining the probabilities from all possible combinations of the test results and hypothesis values with respect to content of Web pages of determined content type with the test results of the subject Web page of undetermined content type using at least one Bayesian network and (iii) for each potential content type, assigning a respective probability that at least some contents of that type exists on the subject Web page being of the potential content type, and indicating content type exclusive of indicating language in which content is written.

10. Apparatus as claimed in claim 9 wherein the set of potential content types include any combination of contact information, press release, company description, employee list, other.

11. Apparatus as claimed in claim 9 wherein the test module produces a respective confidence level for each potential content type, that at least some content of the subject Web page is of the potential content type.

12. Apparatus as claimed in claim 9 further comprising a training member for training the Bayesian network using a training set of Web pages with respective known content types, such that statistics on the test results are collected on the training set of Web pages.

13. Apparatus as claimed in claim 9 wherein the predefined set includes a potential content type of at least one of organization description, organization history, organization mission, organization products/services, organization members, organization contact information, management team information, job opportunities, press releases, calendar of events/activities, biographical data, articles/news with information about people, articles/news with information about organizations and employee roster.

14. Apparatus as claimed in claim 13 wherein the processor-executed tests include at least one of:
(i) determining whether a predefined piece of data or keyword appears in the subject Web page;
(ii) examining text properties; or
(iii) determining whether the predefined piece of data or keyword appears in URLs in the subject Web page.

15. Apparatus as claimed in claim 9 wherein the processor-executed tests include any of:
(i) determining whether a predefined piece of data or keyword appears in the subject Web page;
(ii) examining text properties; or
(iii) determining whether the predefined piece of data or keyword appears in URLs in the subject Web page.

16. Apparatus as claimed in claim 9 further comprising storage means for receiving and storing indications of the assigned probabilities of each content type per Web page as determined by the test module, such that the storage means provides a cross reference between a Web page and respective content types of contents found on that Web page.

17. A method as claimed in claim 1 wherein the at least one binary test and the at least one non-binary tests include one or more of the following tests:
i) whether the subject Web page contains a press release;
ii) whether the subject Web page has a title;
iii) whether the subject Web page has a copyright statement;
iv) whether the subject Web page has a navigation map;
v) whether the subject Web page has a line with a keyword followed by at least another keyword within the next 10, 20, 30 or 40 lines;
vii) whether a first sentence of a first paragraph of the subject Web page has a date;
viii) whether the first sentence of the first paragraph of the subject Web page is preceded by a header line;
ix) whether the first sentence of the first paragraph of the subject Web page contains the keyword or a form of the keyword;
xi) whether the subject Web page contains a text line starting with the keyword; and
xii) a calculation of a percentage of header lines, the average sentence length, number of different domains, number of lines that contain the keyword or number of phrases that contain the keyword.

18. Apparatus as claimed in claim 9 wherein the at least one binary test and the at least one non-binary tests include one or more of the following tests:
i) whether the subject Web page contains a press release;
ii) whether the subject Web page has a title;
iii) whether the subject Web page has a copyright statement;
iv) whether the subject Web page has a navigation map;
v) whether the subject Web page has a line with a keyword followed by at least another keyword within the next 10, 20, 30 or 40 lines;
vii) whether a first sentence of a first paragraph of the subject Web page has a date;
viii) whether the first sentence of the first paragraph of the subject Web page is preceded by a header line;
ix) whether the first sentence of the first paragraph of the subject Web page contains the keyword or a form of the keyword;
xi) whether the subject Web page contains a text line starting with the keyword; and
xii) calculation of a percentage of header lines, the average sentence length, number of different domains, number of lines that contain the keyword or number of phrases that contain the keyword.

19. The method of claim 1, wherein the at least one test examining syntax or grammar includes at least one test measuring one of the following: number of passive sentences, number of sentences without a verb, and percentage of verbs in past tense.

20. The apparatus of claim 9, wherein the at least one test examining syntax or grammar includes at least one test measuring one of the following: number of passive sentences, number of sentences without a verb, and percentage of verbs in past tense.

* * * * *

UNITED STATES PATENT AND TRADEMARK OFFICE
CERTIFICATE OF CORRECTION

PATENT NO. : 7,356,761 B2
APPLICATION NO. : 09/768869
DATED : April 8, 2008
INVENTOR(S) : Kosmas Karadimitriou et al.

It is certified that error appears in the above-identified patent and that said Letters Patent is hereby corrected as shown below:

In Column 15, line 53, after "series" delete the second occurrence of "of tests".

Signed and Sealed this

Eighth Day of July, 2008

JON W. DUDAS
*Director of the United States Patent and Trademark Office*